(12) United States Patent
Ota et al.

(10) Patent No.: US 11,563,464 B2
(45) Date of Patent: Jan. 24, 2023

(54) SIGNAL PROCESSING DEVICE AND INTER-BEAM INTERFERENCE SUPPRESSION METHOD

(71) Applicant: FUJITSU LIMITED, Kawasaki (JP)

(72) Inventors: Tomoya Ota, Kawasaki (JP); Hiroyoshi Ishikawa, Kawasaki (JP); Toru Maniwa, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/472,739

(22) Filed: Sep. 13, 2021

(65) Prior Publication Data
US 2022/0182105 A1 Jun. 9, 2022

(30) Foreign Application Priority Data
Dec. 4, 2020 (JP) .............................. JP2020-202019

(51) Int. Cl.
*H04B 7/01* (2006.01)
*H04B 1/7107* (2011.01)
(Continued)

(52) U.S. Cl.
CPC ............. *H04B 7/01* (2013.01); *H04B 1/0483* (2013.01); *H04B 1/7107* (2013.01); *H04B 7/0408* (2013.01); *H04B 2001/0425* (2013.01)

(58) Field of Classification Search
CPC ...... H04B 7/01; H04B 1/0483; H04B 1/7107; H04B 7/0408; H04B 2001/0425
See application file for complete search history.

(56) References Cited

U.S. PATENT DOCUMENTS

| 9,118,361 | B2 * | 8/2015 | Barker ................. H04B 7/0408 |
| 2004/0077379 | A1 * | 4/2004 | Smith ................... H04W 16/10 |
| | | | 455/562.1 |

(Continued)

FOREIGN PATENT DOCUMENTS

| JP | 2019-154024 A | 9/2019 |
| JP | 2019-208165 A | 12/2019 |

OTHER PUBLICATIONS

Mahmoud Abdelaziz et al., "Digital Predistortion for Hybrid MIMO Transmitters", IEEE Journal of Selected Topics in Signal Processing, vol. 12, No. 3, pp. 445-454, Jun. 2018 (Total 10 pages).

(Continued)

*Primary Examiner* — Jean B Corrielus
(74) *Attorney, Agent, or Firm* — Fujitsu Patent Center

(57) ABSTRACT

A signal processing device includes: a first subarray that includes power amplifiers and phase shifters and that forms a first beam facing in a first direction; a second subarray that includes power amplifiers and phase shifters and that forms a second beam facing in a second direction; a feedback unit that feeds back at least signals that are output from the power amplifiers included in the first subarray; and a processor that is connected to the first subarray and the second subarray. The processor executes a process including: generating, based on a first feedback signal and a transmission signal output to the first subarray, a cancellation signal corresponding to an interference component applied to the second beam by the first beam; and adding the generated cancellation signal to a transmission signal output to the second subarray.

14 Claims, 10 Drawing Sheets

(51) Int. Cl.
 *H04B 1/04* (2006.01)
 *H04B 7/0408* (2017.01)

(56) References Cited

U.S. PATENT DOCUMENTS

2018/0007718 A1* 1/2018 Tujkovic .............. H04W 76/10
2021/0351517 A1* 11/2021 Mishra ................ H04B 1/0458

OTHER PUBLICATIONS

Suguru Habu et al., "Outband Radiation and Modulation Accuracy of Unified Beamforming DPD", 2018 IEEE 29th Annual International Symposium on Personal, Indoor, and Mobile Radio Communications (PIMRC), pp. 225-230, Sep. 2018 Total 6 pages).

* cited by examiner

SIGNAL PROCESSING DEVICE AND INTER-BEAM INTERFERENCE SUPPRESSION METHOD

CROSS-REFERENCE TO RELATED APPLICATION

This application is based upon and claims the benefit of priority of the prior Japanese Patent Application No. 2020-202019, filed on Dec. 4, 2020, the entire contents of which are incorporated herein by reference.

FIELD

The embodiments discussed herein are related to a signal processing device and an inter-beam interference suppression method.

BACKGROUND

In general, in radio transmission devices, such as base station devices, power amplifiers that amplify electrical power of transmission signals are provided. In the radio transmission devices, in order to enhance power efficiency, the power amplifiers are sometimes operated in the vicinity of a saturation area in which output power is saturated with respect to input electrical power. When the power amplifiers are operated in the vicinity of the saturation area, nonlinear distortion that is generated in the power amplifiers is increased. Thus, in order to suppress the nonlinear distortion and meet the standards for the adjacent channel leakage ratio (ACLR) and the spectrum emission mask (SEM), the radio transmission devices sometimes perform distortion compensation that compensates the nonlinear distortion.

Specifically, there is a pre-distortion technique as one of the distortion compensation techniques. When distortion compensation is performed by using the pre-distortion technique, a distortion compensation coefficient having an inverse characteristic of nonlinear distortion that is generated in a power amplifier is previously multiplied by a transmission signal that is not yet input to the power amplifier. Consequently, the linearity of an output of the power amplifier is enhanced and the nonlinear distortion is suppressed. In the pre-distortion technique, an output signal of the power amplifier is fed back, a distortion compensation coefficient is calculated or adaptively updated by using a look-up table (LUT) or series.

Incidentally, some radio transmission devices include an array antenna and perform beamforming to form a beam that faces a desired direction. This type of the radio transmission device includes a plurality of power amplifiers that are associated with antenna elements in order to amplify each of the transmission signals that are branched off to a plurality of antenna elements. Then, it is conceivable to collectively compensate nonlinear distortion generating in these plurality of power amplifiers. Namely, distortion compensation is performed by multiplying a distortion compensation coefficient that suppresses nonlinear distortion in a direction of a beam by the transmission signal that is not yet branched off to the plurality of antenna elements.

Patent Document 1: Japanese Laid-open Patent Publication No. 2019-208165

Patent Document 2: Japanese Laid-open Patent Publication No. 2019-154024

Non-Patent Document 1: M. Abdelaziz, et al., "Digital Pre-distortion for Hybrid MIMO Transmitters", IEEE Journal of selected topics in signal processing, vol. 12, no. 3, pp. 445-454, June 2018

Non-Patent Document 2: S. Habu et al., "Outband Radiation and Modulation Accuracy of Unified Beamforming DPD", PIMRC 2018, pp. 225-230, September 2018

In recent years, in order to implement high throughput with low power consumption, a beam multiplexing system using hybrid beamforming is proposed. In the hybrid beamforming, an array antenna is grouped into subarrays, the number of which is the same as the number of beams to be multiplexed, and beamforming is performed in each of the subarrays by using an analog method performed by using phase shifters. Consequently, beam multiplexing for causing the beams formed by the respective subarrays to face in different directions is performed. According to the hybrid beamforming, the number of analog circuits, such as digital/analog (D/A) converters or up-converters, needed is only the number corresponding to the number of subarrays; therefore, it is possible to suppress power consumption or component costs as compared to the beamforming performed using a fully digital method.

However, in the beam multiplexing system described above, there is a problem in that interference occurs between beams that are formed by the respective subarrays and throughput is thus decreased. Specifically, for example, when variations occur in the nonlinear characteristics of the power amplifiers included in a single subarray, nonlinear distortion in the beam direction is suppressed by the distortion compensation performed by using the pre-distortion technique; however, nonlinear distortion out of the beam direction remains and interference to the beam direction of another subarray occurs. Namely, when the nonlinear distortion generated in the plurality of power amplifiers included in the subarray is collectively compensated, nonlinear distortion in the beam direction formed by the subject subarray is suppressed; however, the nonlinear distortion in each of the power amplifiers is not always suppressed.

Accordingly, nonlinear distortion is generated in the directions other than the direction of the beam direction and interference is applied to the beam direction of the other subarray.

Furthermore, in the beamforming using a phase shifter, at the same time as forming of the main lobe that has the maximum gain in the beam direction, side lobes each having a relatively large gain are generated in the directions other than the beam direction. Consequently, when the direction of one of the side lobes that is formed by a subarray overlaps the direction of the main lobe that is formed by another subarray, inter-beam interference formed by these subarrays occurs.

As described above, when inter-beam interference of each of the subarrays occurs due to nonlinear distortion or the side lobes, the signal-to-interference ratio (SIR) in a radio reception device, such as a terminal device, located in the beam direction is decreased and, as a result, a decrease in throughput occurs.

SUMMARY

According to an aspect of an embodiment, a signal processing device includes: a first subarray that includes a plurality of power amplifiers and a plurality of phase shifters that are associated with a plurality of antenna elements, respectively, and that forms a first beam facing in a first direction; a second subarray that includes a plurality of power amplifiers and a plurality of phase shifters that are associated with a plurality of antenna elements, respectively, and that forms a second beam facing in a second direction that is different from the first direction; a feedback unit that feeds back at least signals that are output from the plurality of power amplifiers included in the first subarray; and a processor that is connected to the first subarray and the second subarray and that outputs a transmission signal to the first subarray and the second subarray. The processor executes a process including: generating, based on a first feedback signal that is fed back by the feedback unit and the transmission signal that is output to the first subarray, a cancellation signal corresponding to an interference component that is applied to the second beam by the first beam; and adding the generated cancellation signal to the transmission signal that is output to the second subarray.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The present invention is not limited to the embodiments.

[a] First Embodiment

Figure 1:
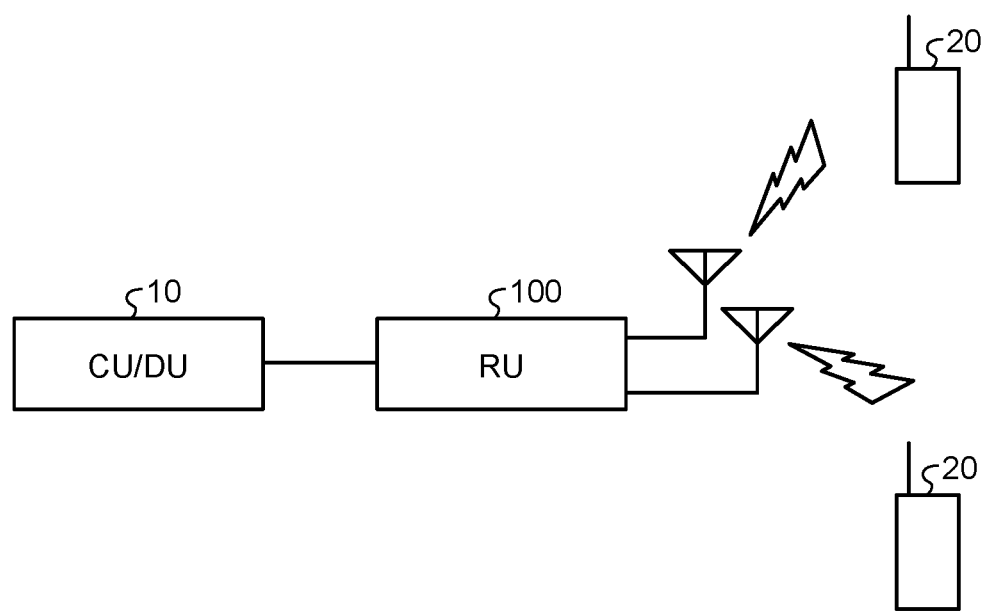
FIG. 1 is a diagram illustrating a configuration example of a radio communication system.

FIG. 1 is a diagram illustrating a configuration example of a radio communication system according to a first embodiment. As illustrated in FIG. 1, the radio communication system includes a central unit (CU)/distributed unit (DU) 10, a radio unit (RU) 100, and pieces of user equipments (UEs) 20.

The CU/DU 10 is connected to a core network (not illustrated) and performs a process of baseband with respect to data that is transmitted to the UEs 20 or data that is received from the UEs 20. The CU/DU 10 may also be constructed from a single device by integrating the CU and the DU, or may also be constructed from a plurality of devices by providing the CU and the DU as separate units. The CU/DU 10 and the RU 100 function as a base station device in the radio communication system.

The RU 100 performs the radio frequency (RF) process on the data that is transmitted to the UEs 20 or the data that is received from the UEs 20. The RU 100 includes an array antenna constituted of a plurality of antenna elements and performs radio communication with the UEs 20 by forming a beam associated with each of the plurality of pieces of respective UEs 20. At this time, the RU 100 performs distortion compensation that compensates nonlinear distortion in the power amplifier for each subarray for forming each of the beams and performs signal processing for suppressing inter-beam interference for each subarray. The configuration of the RU 100 will be described in detail later.

The UE 20 is a terminal device that performs radio communication with the RU 100. Namely, the UE 20 receives a radio signal from the RU 100 and transmits a radio signal to the RU 100.

Figure 2:
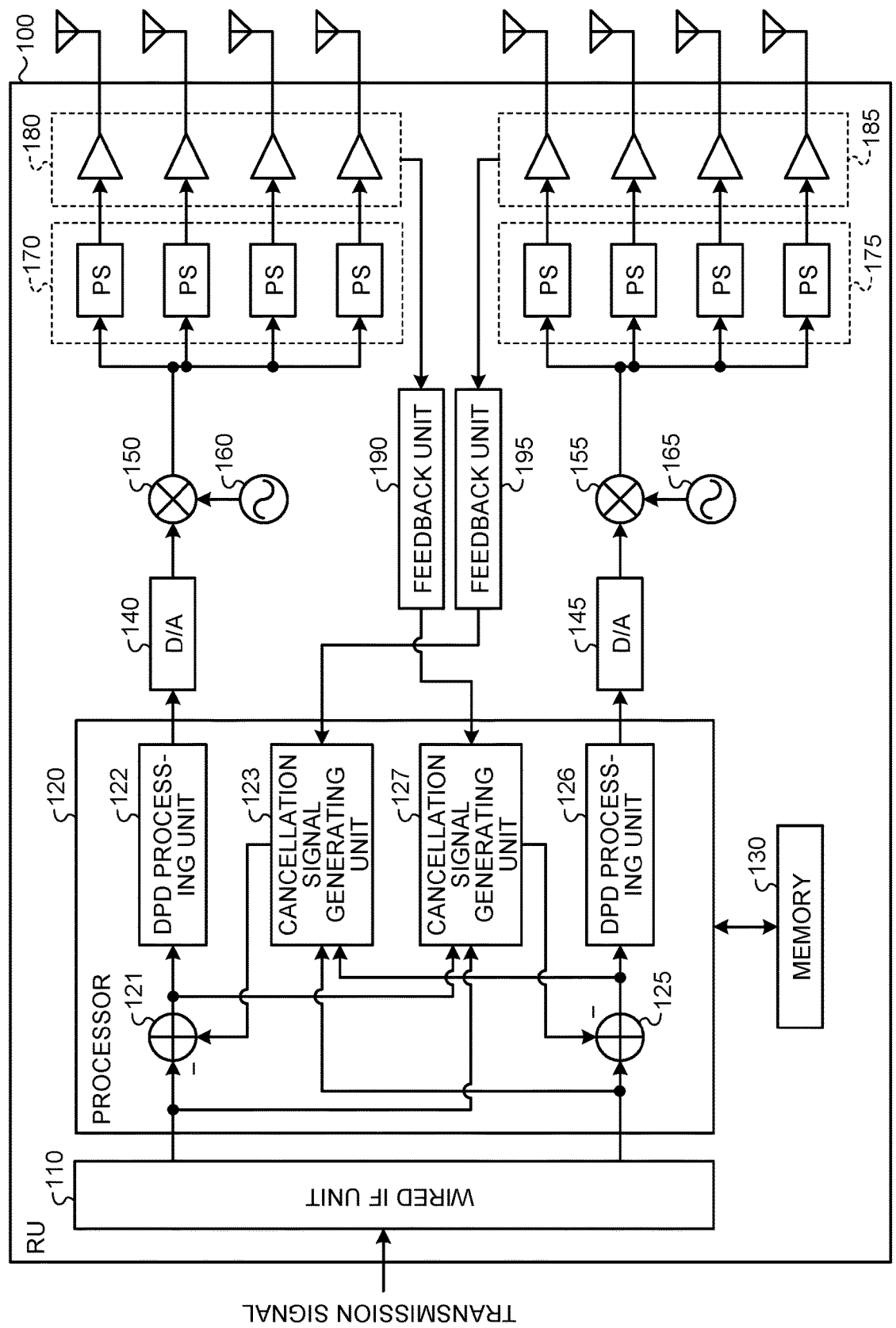
FIG. 2 is a block diagram illustrating a configuration of a RU according to a first embodiment.

FIG. 2 is a block diagram illustrating a configuration of the RU 100 according to the first embodiment. The RU 100 illustrated in FIG. 2 includes a wired interface unit (hereinafter, simply referred to as a "wired IF unit") 110, a processor 120, a memory 130, D/A (digital/analog) converters (hereinafter, simply referred to as a "D/A") 140 and 145, up-converters 150 and 155, local oscillators 160 and 165, phase shifters (PS) 170 and 175, power amplifiers 180 and 185, and feedback units 190 and 195.

Furthermore, the RU 100 illustrated in FIG. 2 includes an array antenna having two subarrays and, in a description below, the subarray associated with the D/A 140, the up-converter 150, the local oscillator 160, the phase shifter 170, and the power amplifier 180 is referred to as a "first subarray", whereas the subarray associated with the D/A 145, the up-converter 155, the local oscillator 165, the phase shifter 175, and the power amplifier 185 is referred to as a "second subarray". Furthermore, a beam formed by the first subarray is referred to as a "first beam", whereas a beam formed by the second subarray is referred to as a "second beam".

The wired IF unit 110 is connected to the CU/DU 10 by using a wired connection and receives, from the CU/DU 10, a transmission signal that is transmitted to the UE 20. Furthermore, the wired IF unit 110 transmits, to the CU/DU 10, a reception signal that is received from the UE 20. The wired IF unit 110 receives, from the CU/DU 10, each of a transmission signal that is transmitted from the first subarray and a transmission signal that is transmitted from the second subarray in accordance with the UE 20 that is the destination of the transmission signal, and then, outputs the received transmission signals to the processor 120.

The processor 120 includes, for example, a central processing unit (CPU), a field programmable gate array (FPGA), a digital signal processor (DSP), or the like and performs overall control of the RU 100. Specifically, the processor 120 includes cancellation signal adding units 121 and 125, digital pre-distortion (DPD) processing units 122 and 126, and cancellation signal generating units 123 and 127.

The cancellation signal adding unit 121 adds a cancellation signal generated by the cancellation signal generating unit 123 to the transmission signal that is transmitted from the first subarray. Specifically, the cancellation signal adding unit 121 subtracts the cancellation signal corresponding to interference that is applied from the second beam formed by the second subarray from the transmission signal that is transmitted from the first subarray.

The DPD processing unit 122 performs distortion compensation on the transmission signal transmitted from the first subarray. Namely, by multiplying a distortion compensation coefficient by the transmission signal transmitted from the first subarray, the DPD processing unit 122 collectively compensates nonlinear distortion generated in the power amplifier 180 associated with the first subarray. Furthermore, in FIG. 2, a feedback circuit from the power amplifier 180 to the DPD processing unit 122 for updating the distortion compensation coefficient is not illustrated.

The cancellation signal generating unit 123 generates a cancellation signal for cancelling the interference applied from the second beam to the first beam. Namely, the cancellation signal generating unit 123 calculates a nonlinear model of interference applied to the first beam by the second beam and generates, by using the nonlinear model, a cancellation signal that corresponds to the interference applied from the second beam to the first beam. Then, the cancellation signal generating unit 123 outputs the generated cancellation signal to the cancellation signal adding unit 121.

The cancellation signal adding unit 125 adds the cancellation signal generated by the cancellation signal generating unit 127 to the transmission signal that is transmitted from the second subarray. Specifically, the cancellation signal adding unit 125 subtracts the cancellation signal corresponding to interference that is received from the first beam formed by the first subarray from the transmission signal that is transmitted from the second subarray.

The DPD processing unit 126 performs distortion compensation on the transmission signal transmitted from the second subarray. Namely, by multiplying a distortion compensation coefficient by the transmission signal transmitted from the second subarray, the DPD processing unit 126 collectively compensates the nonlinear distortion occurring in the power amplifier 185 associated with the second subarray. Furthermore, in FIG. 2, a feedback circuit from the power amplifier 185 to the DPD processing unit 126 for updating the distortion compensation coefficient is not illustrated.

The cancellation signal generating unit 127 generates a cancellation signal for cancelling the interference applied from the first beam to the second beam. Namely, the cancellation signal generating unit 127 calculates a nonlinear model of interference applied to the second beam by the first beam and generates, by using the nonlinear model, a cancellation signal that corresponds to the interference applied from the first beam to the second beam. Then, the cancellation signal generating unit 127 outputs the generated cancellation signal to the cancellation signal adding unit 125. Furthermore, the cancellation signal generating unit 127 will be described in detail later.

The memory 130 includes, for example, a random access memory (RAM), a read only memory (ROM), or the like, and stores therein information that is used for a process performed by the processor 120.

The D/A 140 performs D/A conversion on a transmission signal (hereinafter, referred to as a "compensation signal") that is subjected to distortion compensation by the DPD processing unit 122. Similarly, the D/A 145 performs D/A conversion on a transmission signal (compensation signal) that is subjected to distortion compensation by the DPD processing unit 126.

The up-converter 150 performs up-conversion on the transmission signal that is transmitted from the first subarray and that is subjected to D/A conversion and converts the processed signal to a signal with a radio frequency. Similarly, the up-converter 155 performs up-conversion on the transmission signal that is transmitted from the second subarray and that is subjected to D/A conversion and converts the processed signal to a signal with a radio frequency.

The local oscillator 160 generates a local frequency for up-conversion performed by the up-converter 150. Similarly, the local oscillator 165 generates a local frequency for up-conversion performed by the up-converter 155. Furthermore, for the local oscillators 160 and 165, a single oscillator may also be shared.

The phase shifter 170 is provided in association with each of the plurality of antenna elements included in the first subarray and forms the first beam by setting a weight to a signal associated with each of the antenna elements and shifting the phase. Similarly, the phase shifter 175 is provided in association with each of the plurality of antenna elements included in the second subarray and forms the second beam by setting a weight to a signal associated with each of the antenna elements and shifting the phase.

The power amplifier 180 is provided in association with each of the plurality of antenna elements included in the first subarray and amplifies electrical power of the signal associated with each of the antenna elements. Similarly, the power amplifier 185 is provided in association with each of the plurality of antenna elements included in the second subarray and amplifies electrical power of the signal associated with each of the antenna elements. When each of the power amplifiers 180 and 185 amplifies the electrical power of the signal, nonlinear distortion occurs; however, the DPD processing units 122 and 126 for each of the subarrays perform distortion compensation, so that the nonlinear distortion is suppressed in the direction of the beam that is formed by each of the subarrays.

In contrast, when nonlinear characteristics of the power amplifiers 180 and 185 provided in the respective antenna elements vary, the nonlinear distortion remains in the direction other than the direction of the beam that is formed by each of the subarrays. Consequently, when a radio transmission signal is emitted from each of the antenna elements included in the respective subarrays, the nonlinear distortion that occurs in the direction other than the direction of the first beam applies interference to the second beam, and the nonlinear distortion that occurs in the direction other than the direction of the second beam applies interference to the first beam. In the embodiment, a cancellation signal is previously added to the transmission signal of each of the subarrays; therefore, interference applied from another beam is canceled out by the cancellation signal.

The feedback unit 190 feeds back the radio transmission signal that is output from the power amplifier 180 associated with the first subarray, and then, outputs the signal to the cancellation signal generating unit 127. At this time, the feedback unit 190 outputs, to the cancellation signal generating unit 127, a signal component in the direction of the second beam from among the radio transmission signals output from the power amplifier 180 as a feedback signal. The feedback unit 195 feeds back the radio transmission signal that is output from the power amplifier 185 associated with the second subarray, and then, outputs the signal to the cancellation signal generating unit 123. At this time, the feedback unit 195 outputs, to the cancellation signal generating unit 123, a signal component in the direction of the first beam from among the radio transmission signals output from the power amplifier 185 as a feedback signal.

Figure 3:
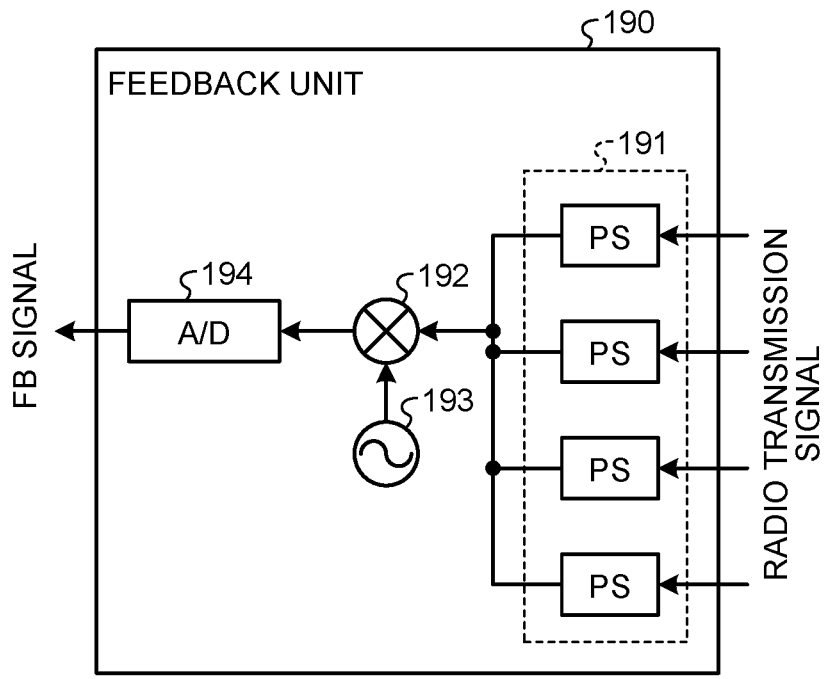
FIG. 3 is a block diagram illustrating a configuration of a feedback unit according to the first embodiment.

FIG. 3 is a block diagram illustrating a configuration of the feedback unit 190 according to the first embodiment. Furthermore, the feedback unit 195 has the same configuration as that of the feedback unit 190 illustrated in FIG. 3.

As illustrated in FIG. 3, the feedback unit 190 includes a phase shifter (PS) 191, a down-converter 192, a local oscillator 193, and an analog/digital (A/D) converter (hereinafter, simply referred to as an "A/D") 194.

The phase shifter 191 extracts a signal component that corresponds to interference applied from the first beam to the second beam by shifting the phase by setting a weight to the radio transmission signal that is output from the power amplifier 180 associated with the first subarray. Namely, the phase shifter 191 sets a weight that is the inverse of the weight that is set in the phase shifter 175 associated with the second subarray, and then, extracts the signal component in the direction of the second beam from the radio transmission signal that is transmitted from the first subarray.

The down-converter 192 performs down-conversion on the signal component in the direction of the second beam extracted by the phase shifter 191 and converts the signal to the signal with a baseband frequency.

The local oscillator 193 generates a local frequency for down-conversion performed by the down-converter 192. Furthermore, as the local oscillator 193, the same oscillator as the local oscillators 160 and 165 may also be shared.

The A/D 194 performs A/D conversion on the signal component that has been subjected to down-conversion by the down-converter 192 and outputs the signal as a feedback signal (hereinafter, simply referred to as a "FB signal") to the cancellation signal generating unit 127.

In this way, the feedback unit 190 extracts, from the radio transmission signal that is output from the power amplifier 180 associated with the first subarray, the signal component that corresponds to interference applied to the second beam, and then, feeds back the obtained signal component as the FB signal to the cancellation signal generating unit 127 that generates a cancellation signal of the second subarray. Furthermore, although not illustrated, the feedback unit 195 extracts, from the radio transmission signal that is output from the power amplifier 185 associated with the second subarray, the signal component that corresponds to interference applied to the first beam, and then, feeds back the obtained signal component as the FB signal to the cancellation signal generating unit 123 that generates a cancellation signal of the first subarray.

Figure 4:
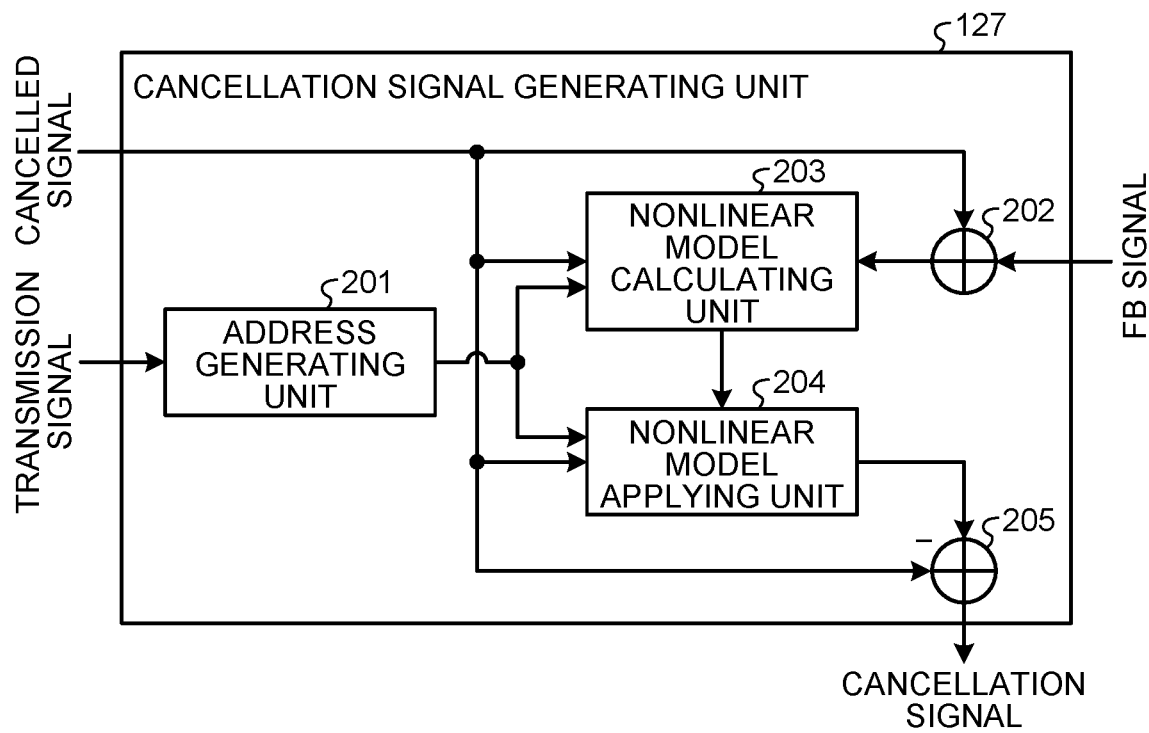
FIG. 4 is a block diagram illustrating a configuration of a cancellation signal generating unit according to the first embodiment.

FIG. 4 is a block diagram illustrating a configuration of the cancellation signal generating unit 127 according to the first embodiment. Furthermore, the cancellation signal generating unit 123 has the same configuration as that of the cancellation signal generating unit 127 illustrated in FIG. 4.

As illustrated in FIG. 4, the cancellation signal generating unit 127 includes an address generating unit 201, an add operation unit 202, a nonlinear model calculating unit 203, a nonlinear model applying unit 204, and a subtraction unit 205.

The address generating unit 201 generates, on the basis of the transmission signals transmitted from the first subarray, addresses that are used in a lookup table (LUT) that stores therein coefficients of the nonlinear model. Specifically, the address generating unit 201 generates addresses associated with the electrical power or the amplitude of the respective transmission signals transmitted from the first subarray. The LUT stores therein coefficients of the nonlinear model in association with the addresses.

The add operation unit 202 adds a canceled signal, in which inter-beam interference has been canceled out by the cancellation signal adding unit 121, to the FB signal that is fed back by the feedback unit 190. Namely, the add operation unit 202 adds the canceled signal that is the main signal transmitted from the first subarray to the FB signal that corresponds to interference with respect to the second beam.

The nonlinear model calculating unit 203 includes the LUT that stores therein the coefficients of the nonlinear model in association with the addresses and reads, from the LUT, the coefficient stored in the address that is generated by the address generating unit 201. Then, the nonlinear model calculating unit 203 updates the coefficient such that the nonlinear model based on the read coefficient derives an output signal of the add operation unit 202 from the canceled signal.

Specifically, the nonlinear model calculating unit 203 updates a coefficient $LUT_{21}(i_1)$ of the nonlinear model read from the address $i_1$ that is generated on the basis of the transmission signal transmitted from the first subarray by using a canceled signal $u_1(n)$ transmitted from the first subarray and an output signal $y'_{21}(n)$ of the add operation unit 202. Namely, the nonlinear model calculating unit 203 calculates a nonlinear model in which the canceled signal $u_1(n)$ transmitted from the first subarray is used as an input and the output signal $y'_{21}(n)$ of the add operation unit 202 is used as an output. Here, the output signal $y'_{21}(n)$ of the add operation unit 202 is the sum of the FB signal $y_{21}(n)$ transmitted from the feedback unit 190 and the canceled signal $u_1(n)$, so that the output signal $y'_{21}(n)$ can be represented by Equation (1) below.

$$y'_{21}(n) = y_{21}(n) + u_1(n) \quad (1)$$

In contrast, when the output signal $y'_{21}(n)$ of the add operation unit 202 is represented by using the canceled signal $u_1(n)$, Equation (2) below holds.

$$y'_{21}(n) = LUT_{21}(i_1) \times u_1(n) + e_{21}(n) \quad (2)$$

where, in Equation (2), $e_{21}(n)$ denotes an error in a case of using the coefficient $LUT_{21}(i_1)$ of the nonlinear model. Thus, the nonlinear model calculating unit 203 updates the coefficient $LUT_{21}(i_1)$ by using, for example, a least mean square (LMS) algorithm such that the error $e_{21}(n)$ is decreased. Namely, the nonlinear model calculating unit 203 updates the coefficient $LUT_{21}(i_1)$ by using Equation (3) below.

$$LUT_{21}(i_1) = LUT_{21}(i_1) + \mu_{21} \times e_{21}(n) \times \{u_1(n)\}^* \quad (3)$$

where, in Equation (3), $\mu_{21}$ denotes a step size parameter, and $\{u_1(n)\}^*$ denotes a complex conjugate of the canceled signal $u_1(n)$.

The nonlinear model calculating unit 203 associates the updated coefficient $LUT_{21}(i_1)$ with the address $i_1$ and stores the associated data. Then, the nonlinear model calculating unit 203 periodically duplicates the LUT to the nonlinear model applying unit 204.

The nonlinear model applying unit 204 includes the LUT that stores therein coefficients of nonlinear model in association with the addresses and reads, from the LUT, the coefficient stored in the address that is generated by the address generating unit 201. Then, the nonlinear model applying unit 204 applies the nonlinear model based on the read coefficient to the canceled signal and generates a replica corresponding to the signal in which interference in the direction of the second beam is added to the canceled signal transmitted from the first subarray. Namely, the nonlinear model applying unit 204 generates a replica u'$_{21}$(n) from the canceled signal u$_1$(n) by using Equation (4) below.

$$u'_{21}(n) = \text{LUT}_{21}(i_1) \times u_1(n) \quad (4)$$

The nonlinear model applying unit 204 outputs the generated replica to the subtraction unit 205.

The subtraction unit 205 subtracts the canceled signal that is the main signal transmitted from the first subarray from the replica that is output from the nonlinear model applying unit 204 and generates a cancellation signal corresponding to interference applied to the second beam. Namely, the subtraction unit 205 calculates a cancellation signal u$_{21}$(n) that cancels the interference applied by the first subarray to the direction of the second beam by using Equation (5) below.

$$u_{21}(n) = u'_{21}(n) - u_1(n) \quad (5)$$

The cancellation signal u$_{21}$(n) is output to the cancellation signal adding unit 125 associated with the second subarray, and the cancellation signal u$_{21}$(n) corresponding to the interference received from the first subarray is previously subtracted from the transmission signal. Consequently, in the radio transmission signal transmitted from the second subarray, interference applied from the first beam to the second beam is suppressed. Furthermore, the cancellation signal is previously added to the transmission signal, and thus, the cancellation signal is also amplified by the power amplifier 185; however, the power of the cancellation signal is smaller than the power of the main signal and is within the power amplified in a linear area of the power amplifier 185. Consequently, nonlinear distortion does not occur in the cancellation signal, and thus, the cancellation signal is able to effectively cancel out the interference received from the first beam in the radio transmission signal that is transmitted from the second subarray.

In this way, the cancellation signal generating unit 127 calculates a nonlinear model from the canceled signal and the FB signal that are associated with the first subarray, generates a cancellation signal corresponding to the interference applied to the second beam by using the nonlinear model, and outputs the cancellation signal transmitted from the second beam to the cancellation signal adding unit 125 associated with the second subarray. Furthermore, although not illustrated, the cancellation signal generating unit 123 calculates a nonlinear model from the canceled signal and the FB signal that are associated with the second subarray, generates a cancellation signal corresponding to the interference applied to the first beam by using the nonlinear model, and outputs the cancellation signal transmitted from the first subarray to the cancellation signal adding unit 121 associated with the first subarray.

Figure 5:
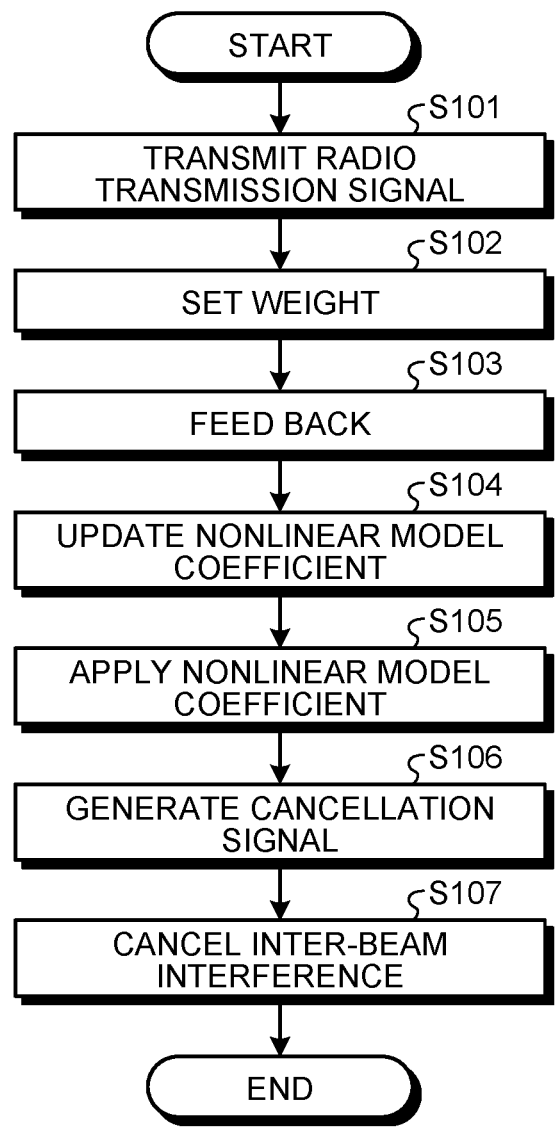
FIG. 5 is a flowchart illustrating an inter-beam interference suppression method according to the first embodiment.

In the following, an inter-beam interference suppression method performed in the RU 100 having configuration described above will be described with reference to the flowchart illustrated in FIG. 5. In a description below, the inter-beam interference suppression method of suppressing interference applied from the first beam to the second beam by generating a cancellation signal from the transmission signal transmitted from the first subarray will be described, and also, the same applies to the inter-beam interference suppression method of suppressing the interference applied from the second beam to the first beam; therefore, both of the states of inter-beam interference are simultaneously suppressed.

After the transmission signal of the first subarray is subjected to distortion compensation by the DPD processing unit 122, the transmission signal of the first subarray is subjected to D/A conversion by the D/A 140, is subjected to up-conversion by the up-converter 150, and is then split to signals associated with the antenna elements included in the first subarray. Then, the phase of each of the signals associated with the respective antenna elements is shifted by the phase shifter 170, so that the first beam is formed and the radio transmission signal that is amplified by the power amplifier 180 is transmitted from each of the antenna elements included in the first subarray (Step S101). The radio transmission signal that is transmitted from the first subarray and in which nonlinear distortion is suppressed in the direction of the first beam is transmitted at the maximum gain in the direction of the first beam. However, when the nonlinear characteristics of the power amplifiers 180 vary, the nonlinear distortion remains in the directions other than the direction of the first beam, and among these directions, the direction in which the gain is relatively high is present in the directions other than the direction of the first beam; therefore, interference is applied to the second beam.

The radio transmission signal that is output from the power amplifier 180 is transmitted from the antenna element and is also simultaneously output to the feedback unit 190. In the feedback unit 190, the weight of the phase shifter 191 is set to the weight that is the inverse of the weight that is set to the phase shifter 175 associated with the second subarray (Step S102). A phase shift is performed by the phase shifter 191 on the radio transmission signal transmitted from each of the antenna elements, so that a signal component in the direction of the second beam is extracted. The extracted signal component is subjected to down-conversion and A/D conversion and is fed back to the cancellation signal generating unit 127 as the FB signal (Step S103).

In the cancellation signal generating unit 127, the transmission signal from the first subarray is input to the address generating unit 201 and the address that is associated with the power of the transmission signal is generated. The generated address is input to the nonlinear model calculating unit 203 and the nonlinear model applying unit 204. Furthermore, the canceled signal from the first subarray is input to the nonlinear model calculating unit 203 and is also input to the add operation unit 202. Then, the canceled signal and the FB signal are added by the add operation unit 202 and the obtained add operation result is input to the nonlinear model calculating unit 203.

If the address is input to the nonlinear model calculating unit 203, the coefficient of the nonlinear model that is stored in association with the address is read from the LUT and is then updated from the canceled signal and the output signal of the add operation unit 202 (Step S104). Specifically, for example, the LMS algorithm is used as represented by Equation (3) above, the coefficient that is read from the LUT is updated, and the updated coefficient is stored in the LUT. The LUT in which the coefficient is updated is periodically duplicated to the nonlinear model applying unit 204.

In contrast, when the address is input to the nonlinear model applying unit 204, the coefficient of the nonlinear model that is stored in association with the address is read from the LUT and the nonlinear model is applied to the canceled signal of the first subarray (Step S105). Namely, as represented by Equation (4) above, by multiplying the coefficient of the nonlinear model by the canceled signal of the first subarray, a replica corresponding to the signal that is obtained by adding interference in the direction of the second beam to the canceled signal of the first subarray is generated. Then, by subtracting the canceled signal from the replica performed by the subtraction unit 205, the cancellation signal that cancels out the interference applied from the first beam to the second beam is generated (Step S106).

The generated cancellation signal is output to the cancellation signal adding unit 125 associated with the second subarray. Then, by subtracting the cancellation signal from the transmission signal of the second subarray performed by the cancellation signal adding unit 125, the interference from the first beam to the second beam is canceled out (Step S107). Namely, by previously subtracting the cancellation signal, which corresponds to the interference received from the first beam, from the transmission signal of the second subarray, the interference received from the first beam is canceled out in the direction of the second beam by which the radio transmission signal of the second subarray is transmitted. Consequently, even when the nonlinear characteristics of the power amplifiers 180 associated with the first subarray vary and nonlinear distortion remains in the directions other than the direction of the first beam, the interference from the first beam is suppressed in the direction of the second beam. As a result, it is possible to prevent a decrease in SIR in the UE 20 that is located in the direction of the second beam and it is thus possible to improve throughput.

As described above, according to the embodiment, a nonlinear model that derives an interference component in the direction of the beam of another subarray from the transmission signal of the own subarray is calculated, a cancellation signal corresponding to the interference applied to the beam of the other subarray is generated by using the nonlinear model, and the cancellation signal is added to the transmission signal of the other subarray. Consequently, when the transmission signal of the other subarray is transmitted from the antenna element, the interference caused by the transmission signal of the own subarray is canceled out and the SIR in the direction of the beam of the other subarray is improved. As a result, the communication quality between the RU and the UE that is located in the direction of the beam of the other subarray becomes favorable, and thus, it is possible to enhance throughput.

Furthermore, in the first embodiment described above, as illustrated in FIG. 4, it is assumed that the cancellation signal generating unit 127 calculates the nonlinear model by using the canceled signal of the first subarray and generates the cancellation signal. However, the cancellation signal is not generated in the initial state of the RU 100, so that the cancellation signal is not added to the transmission signal in the cancellation signal adding units 121 and 125, and it is thus possible to assume that the transmission signal and the canceled signal are the same signals. Therefore, the cancellation signal generating unit 127 may also calculate a nonlinear model by using the transmission signal of the first subarray instead of using the canceled signal of the first subarray and generate a cancellation signal.

Figure 6:
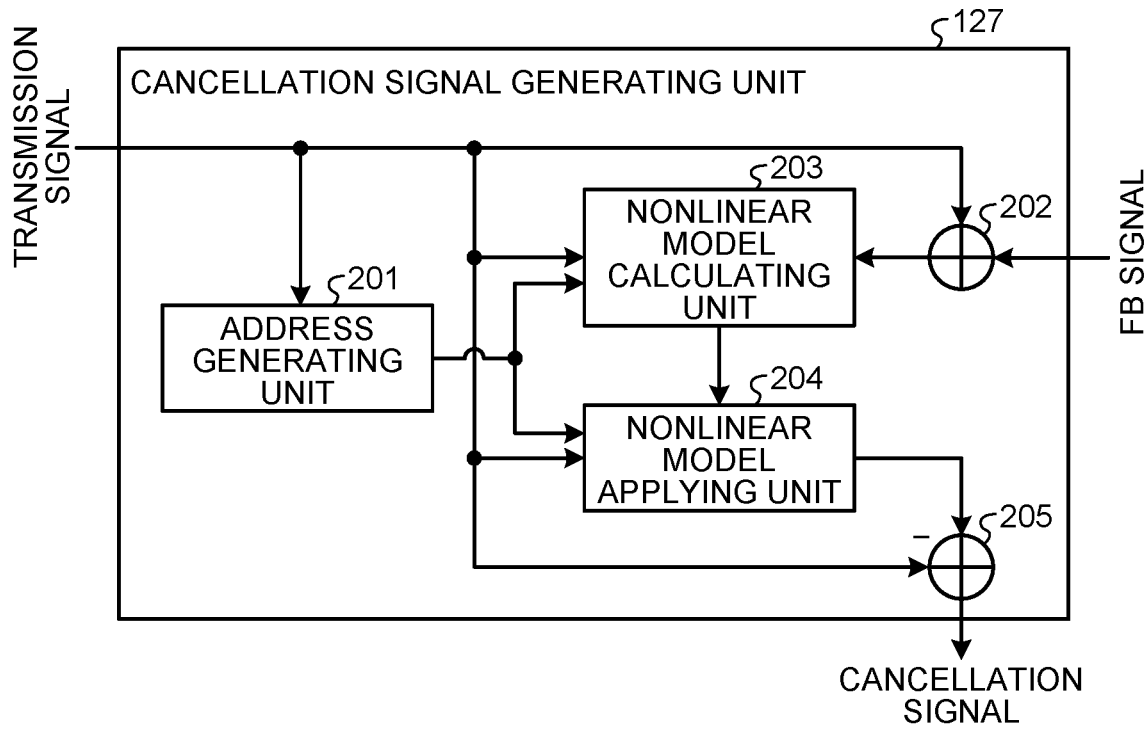
FIG. 6 is a block diagram illustrating a modification example of the cancellation signal generating unit.

Specifically, for example, as illustrated in FIG. 6, the cancellation signal generating unit 127 has a configuration in which the transmission signal of the first subarray is input to the address generating unit 201, the add operation unit 202, the nonlinear model calculating unit 203, the nonlinear model applying unit 204, and the subtraction unit 205. Similarly, the cancellation signal generating unit 123 calculates a nonlinear model by using the transmission signal of the second subarray instead of using the canceled signal of the second subarray and generates a cancellation signal. In also this case, when a cancellation signal is generated by calculating a nonlinear model in the initial state of the RU 100 and, after that, the nonlinear model and the cancellation signal are continuously used, it is possible to suppress inter-beam interference between the first beam and the second beam.

Furthermore, in the first embodiment described above, as represented by Equation (2) above, the coefficient $LUT_{21}$ ($i_1$) of the nonlinear model that is used to derive the output signal $y'_{21}(n)$ of the add operation unit 202 from the canceled signal $u_1(n)$ is calculated; however, it may also be possible to calculate a coefficient having an inverse characteristic of the calculated coefficient. The coefficient $LUT_{21}$ ($i_1$) of the nonlinear model in this case can be obtained Equation (6) below.

$$u_1(n) = LUT_{21}(i_1) \times y'_{21}(n) + e_{21}(n) \quad (6)$$

Then, the nonlinear model calculating unit 203 updates the coefficient $LUT_{21}(i_1)$ by using for example, Equation (7) below such that the error $e_{21}$ (n) is decreased.

$$LUT_{21}(i_1) = LUT_{21}(i_1) + \mu_{21} \times e_{21}(n) \times \{y'_{21}(n)\}^* \quad (7)$$

If the nonlinear model that uses the coefficient $LUT_{21}(i_1)$ having the inverse characteristic is used, in the cancellation signal adding unit 125, a cancellation signal is added to the transmission signal of the second subarray. Consequently, the cancellation signal having the inverse characteristic of the interference applied from the first beam to the second beam is added to the transmission signal of the second subarray, so that the interference received from the first beam is canceled out in the direction of the second beam in which the radio transmission signal of the second subarray is transmitted.

[b] Second Embodiment

The characteristic of a second embodiment is to suppress inter-beam interference applied by a side lobe of the beam of each of the subarrays.

Configurations of a radio communication system and the RU 100 according to the second embodiment are the same as those described in the first embodiment (FIGS. 1 and 2); therefore, descriptions thereof will be omitted. In the second embodiment, configurations of the cancellation signal generating units 123 and 127 are different from the configurations described in the first embodiment.

Figure 7:
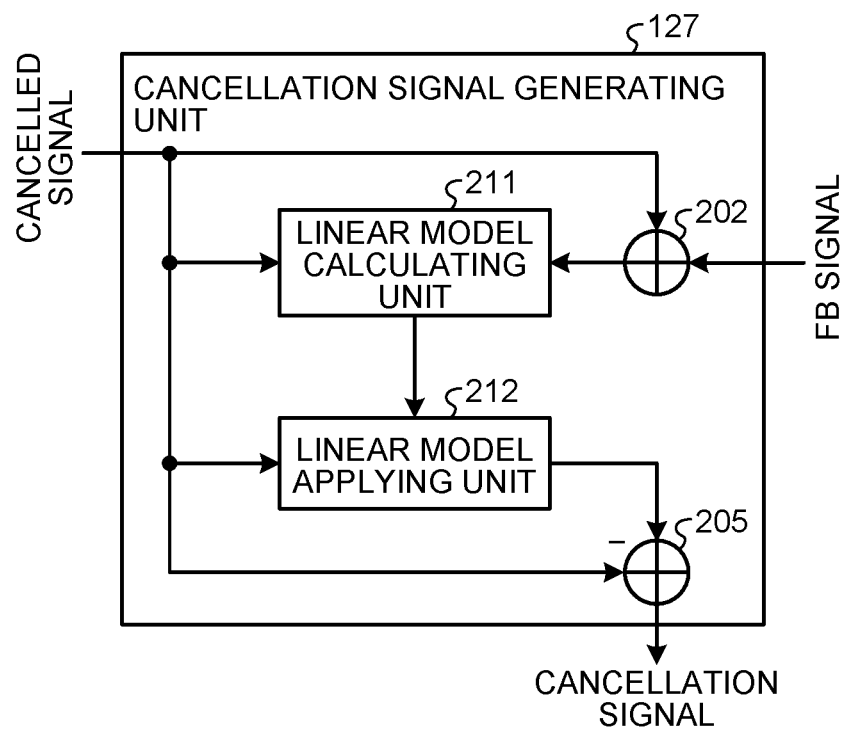
FIG. 7 is a block diagram illustrating a configuration of a cancellation signal generating unit according to a second embodiment.

FIG. 7 is a block diagram illustrating a configuration of the cancellation signal generating unit 127 according to the second embodiment. In FIG. 7, components that are the same as those illustrated in FIG. 4 are assigned the same reference numerals and descriptions thereof will be omitted. Furthermore, the cancellation signal generating unit 123 has the same configuration as that of the cancellation signal generating unit 127 illustrated in FIG. 7.

As illustrated in FIG. 7, the cancellation signal generating unit 127 includes the add operation unit 202, a linear model calculating unit 211, a linear model applying unit 212, and the subtraction unit 205. In the second embodiment, a linear model is used to generate a cancellation signal in order to suppress inter-beam interference caused by the side lobe of the beam instead of the inter-beam interference caused by the nonlinear distortion in the power amplifiers 180 and 185.

The linear model calculating unit 211 calculates a coefficient of a linear model that is used to derive an output signal of the add operation unit 202 from the canceled signal of the first subarray. Specifically, the linear model calculating unit 211 updates a coefficient $\alpha_{21}$ of the linear model from the canceled signal $u_1(n)$ of the first subarray and the output signal $y'_{21}(n)$ of the add operation unit 202. Namely, the linear model calculating unit 211 calculates a linear model in which the canceled signal $u_1(n)$ of the first subarray is used as an input and the output signal $y'_{21}(n)$ of the add operation unit 202 is used as an output.

If the output signal $y'_{21}(n)$ of the add operation unit 202 is represented by using the canceled signal $u_1(n)$, Equation (8) below holds.

$$y'_{21}(n) = \alpha_{21} \times u_1(n) + e_{21}(n) \quad (8)$$

where, in Equation (8), $e_{21}(n)$ denotes an error in a case of using the coefficient $\alpha_{21}$ of the linear model. Thus, the linear model calculating unit 211 updates the coefficient an by using, for example, the LMS algorithm such that the error $e_{21}(n)$ is decreased. Namely, the linear model calculating unit 211 updates the coefficient $\alpha_{21}$ by using Equation (9) below.

$$\alpha_{21} = \alpha_{21} + \mu_{21} \times e_{21}(n) \times \{u_1(n)\}^* \quad (9)$$

The linear model calculating unit 211 stores the updated coefficient $\alpha_{21}$ and periodically duplicates the coefficient to the linear model applying unit 212.

The linear model applying unit 212 applies the linear model based on the coefficient that is duplicated from the linear model calculating unit 211 to the canceled signal and generates a replica corresponding to the signal in which interference in the direction of the second beam is added to the canceled signal of the first subarray. Namely, the linear model applying unit 212 generates a replica $u'_{21}(n)$ from the canceled signal $u_1(n)$ by using Equation (10) below.

$$u'_{21}(n) = \alpha_{21} \times u_1(n) \quad (10)$$

The linear model applying unit 212 outputs the generated replica to the subtraction unit 205.

In this way, the cancellation signal generating unit 127 calculates the linear model from canceled signal and the FB signal that are associated with the first subarray, generates the cancellation signal corresponding to the interference with respect to the second beam by using the linear model, and outputs the cancellation signal to the cancellation signal adding unit 125 associated with the second subarray. Furthermore, although not illustrated, the cancellation signal generating unit 123 calculates the linear model from the canceled signal and the FB signal that are associated with the second subarray, generates the cancellation signal corresponding to the interference with respect to the first beam by using the linear model, and outputs the cancellation signal to the cancellation signal adding unit 121 associated with the first subarray.

Figure 8:
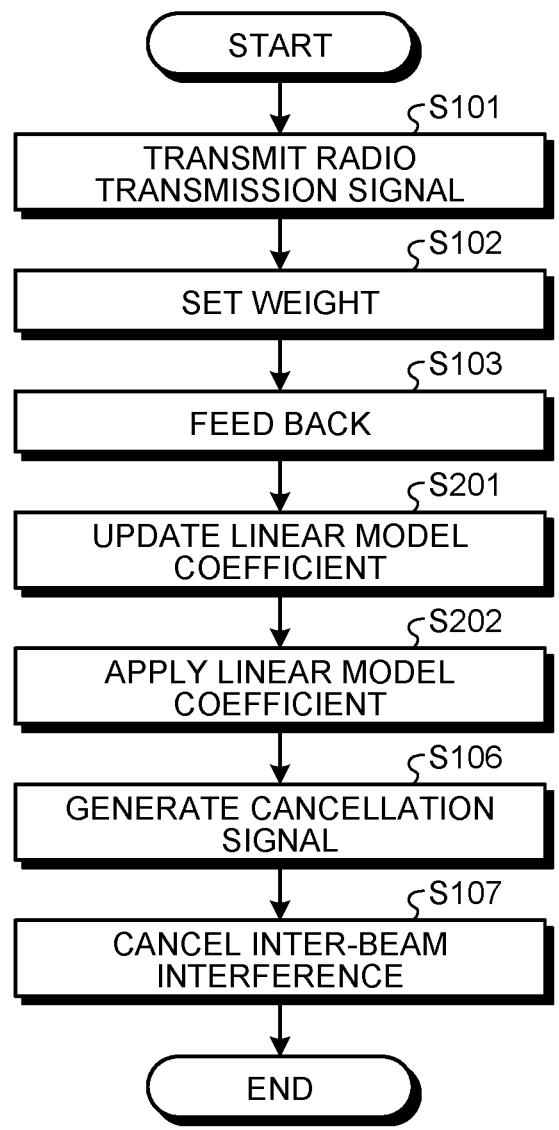
FIG. 8 is a flowchart illustrating an inter-beam interference suppression method according to the second embodiment.

In the following, the inter-beam interference suppression method performed in the RU 100 having the configuration described above will be described with reference to the flowchart illustrated in FIG. 8. In FIG. 8, components that are the same as those illustrated in FIG. 5 are assigned the same reference numerals and descriptions thereof in detail will be omitted. In a description below, the inter-beam interference suppression method of suppressing interference applied from the first beam to the second beam by generating a cancellation signal from the transmission signal of the first subarray will be described, and also, the same applies to the inter-beam interference suppression method of suppressing the interference applied from the second beam to the first beam; therefore, both of the states of inter-beam interference are simultaneously suppressed.

The transmission signal of the first subarray is transmitted from each of the antenna elements of the first subarray by using the first beam (Step S101). At this time, a main lobe having the maximum gain is formed in the direction of the first beam; however, side lobes each having a relatively large gain are also formed in the directions other than the direction of the first beam. Then, the side lobes of the first beam apply interference to the second beam.

The radio transmission signal that is output from the power amplifier 180 is transmitted from the antenna element and is also simultaneously output to the feedback unit 190. In the feedback unit 190, the weight of the phase shifter 191 is set to the weight that is the inverse of the weight that is set to the phase shifter 175 of the second subarray (Step S102). A phase shift is performed by the phase shifter 191 on the radio transmission signal transmitted from each of the antenna elements, so that a signal component in the direction of the second beam is extracted. The extracted signal component is fed back to the cancellation signal generating unit 127 as the FB signal (Step S103).

In the cancellation signal generating unit 127, the canceled signal of the first subarray is input to the linear model calculating unit 211 and is also input to the add operation unit 202. Then, the canceled signal and the FB signal are added by the add operation unit 202 and the obtained add operation result is input to the linear model calculating unit 211.

If the canceled signal and the output signal of the add operation unit 202 are input to the linear model calculating unit 211, the coefficient of the linear model is updated on the basis of these signals (Step S201). Specifically, for example, as represented by Equation (9) above, the coefficient is updated by using the LMS algorithm and the updated coefficient is stored by the linear model calculating unit 211. The updated coefficient is periodically duplicated to the linear model applying unit 212.

In contrast, when the canceled signal is input to the linear model applying unit 212, the linear model is applied to the canceled signal of the first subarray (Step S202). Namely, as represented by Equation (10) above, by multiplying the coefficient of the linear model by the canceled signal of the first subarray, a replica corresponding to the signal that is obtained by adding interference in the direction of the second beam to the canceled signal of the first subarray is generated. Then, by subtracting the canceled signal from the replica performed by the subtraction unit 205, the cancellation signal that cancels out the interference applied from the first beam to the second beam is generated (Step S106).

The generated cancellation signal is output to the cancellation signal adding unit 125 associated with the second subarray and the interference applied from the first beam to the second beam is canceled out (Step S107). Namely, by previously subtracting the cancellation signal, which corresponds to the interference received from the first beam, from the transmission signal of the second subarray, the interference received from the first beam is canceled out in the direction of the second beam by which the radio transmission signal of the second subarray is transmitted. Consequently, even when the side lobes of the first beam are formed in the direction of the second beam, the interference received from the first beam is suppressed in the direction of the second beam. As a result, it is possible to prevent a decrease in SIR in the UE 20 that is located in the direction of the second beam and it is thus possible to improve throughput.

As described above, according to the embodiment, a linear model that derives an interference component in the direction of the beam of another subarray from the transmission signal of the own subarray is calculated, a cancellation signal corresponding to the interference with respect to the beam of the other subarray is generated by using the linear model, and the cancellation signal is added to the transmission signal of the other subarray. Consequently, when the transmission signal of the other subarray is transmitted from the antenna element, the interference caused by the transmission signal of the own subarray is canceled out and the SIR in the direction of the beam of the other subarray is improved. As a result, the communication quality between the RU and the UE that is located in the direction of the beam of the other subarray becomes favorable, and thus, it is possible to enhance throughput.

[c] Third Embodiment

The characteristic of a third embodiment is to suppress interference between beams each having a different frequency.

Configurations of a radio communication system and the RU 100 according to the third embodiment are the same as those described in the first embodiment (FIGS. 1 and 2); therefore, descriptions thereof will be omitted. In the third embodiment, a configuration of the processor 120 is different from that described in the first embodiment. Furthermore, in the third embodiment, the carrier frequency of the transmission signal of the first subarray is denoted by $f_1$, the carrier frequency of the transmission signal of the second subarray is denoted by $f_2$ ($\neq f_1$), and the carrier frequency of the transmission signal is different for each subarray.

Figure 9:
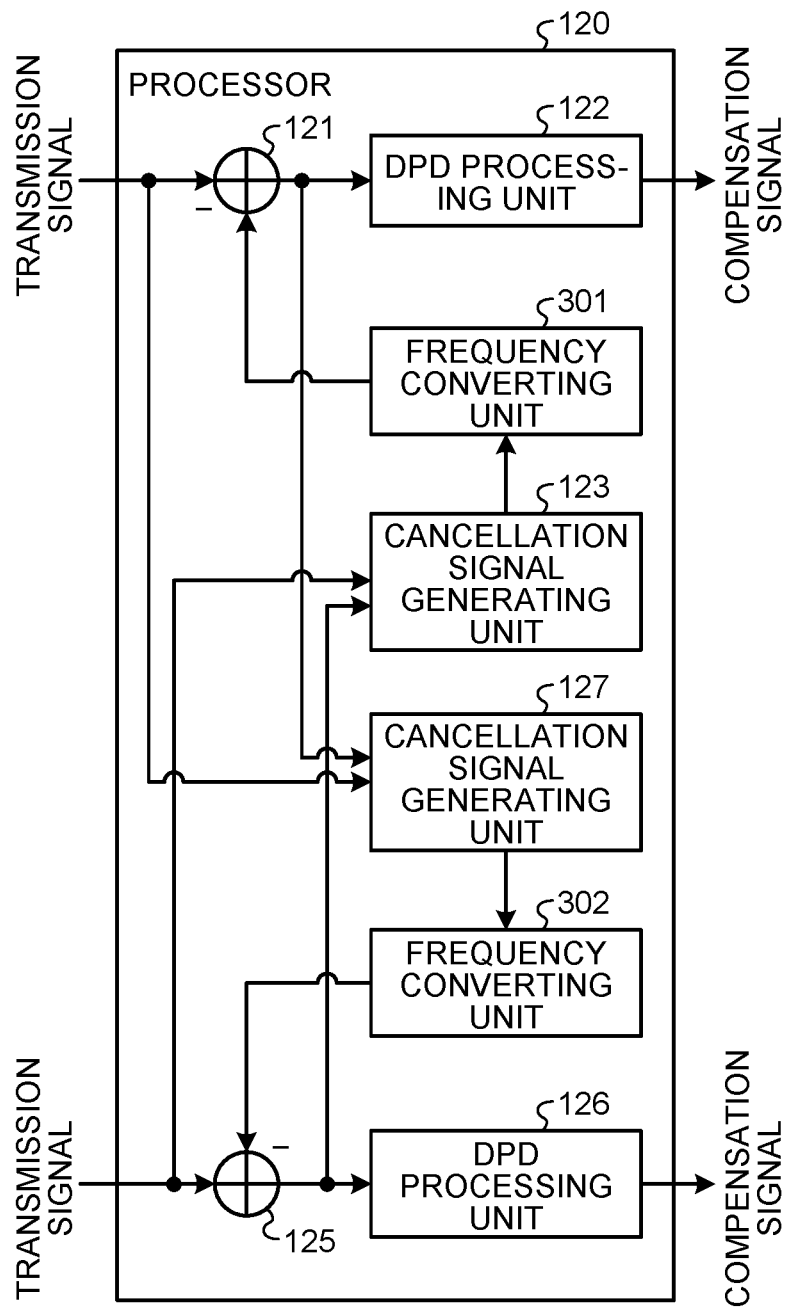
FIG. 9 is a block diagram illustrating a configuration of a processor according to a third embodiment.

FIG. 9 is a block diagram illustrating a configuration of the processor 120 according to the third embodiment. In FIG. 9, components that are the same as those illustrated in FIG. 2 are assigned the same reference numerals and descriptions thereof will be omitted. As illustrated in FIG. 9, the processor 120 has a configuration in which frequency converting units 301 and 302 are added to the processor 120 illustrated in FIG. 2.

The frequency converting unit 301 converts the frequency of the cancellation signal that is generated by the cancellation signal generating unit 123. Specifically, the frequency converting unit 301 converts the frequency of the cancellation signal that is generated by using the transmission signal at the carrier frequency $f_2$ to the frequency that corresponds to a difference between a carrier frequency $f_2$ of the second subarray and a carrier frequency $f_1$ of the first subarray. Namely, the frequency converting unit 301 multiplies a conversion coefficient $c_{12}(n)$ represented by Equation (11) below by a cancellation signal $u_{12}(n)$ and shifts the cancellation signal $u_{12}(n)$ by an amount equal to the frequency $f_{12}=f_2-f_1$.

$$c_{12}(n) = \exp\{j \cdot (2\pi f_{12} n/f_s)\} \quad (11)$$

where, in Equation (11), $f_s$ denotes a sampling rate.

The frequency converting unit 302 converts the frequency of the cancellation signal generated by the cancellation signal generating unit 127. Specifically, the frequency converting unit 302 converts the frequency of the cancellation signal that is generated by using the transmission signal at the carrier frequency $f_1$ to the frequency that corresponds to a difference between the carrier frequency $f_1$ of the first subarray and the carrier frequency $f_2$ of the second subarray. Namely, the frequency converting unit 302 multiplies the conversion coefficient $c_{21}(n)$ indicated by Equation (12) below by the cancellation signal $u_{21}(n)$ and shifts the cancellation signal $u_{21}(n)$ by an amount equal to the frequency $f_{21}=f_1-f_2$.

$$c_{21}(n) = \exp\{j \cdot (2\pi f_{21} n/f_s)\} \quad (12)$$

In this way, the frequency converting units 301 and 302 shift the frequency of the cancellation signal and meet the frequency of the transmission signal of each of the subarray. Consequently, the cancellation signal transmitted from each of the subarrays has the same frequency as that of the signal of the beam that corresponds to the interference source and it is thus possible to suppress the inter-beam interference occurring between the subarrays each having a different frequency.

Figure 10:
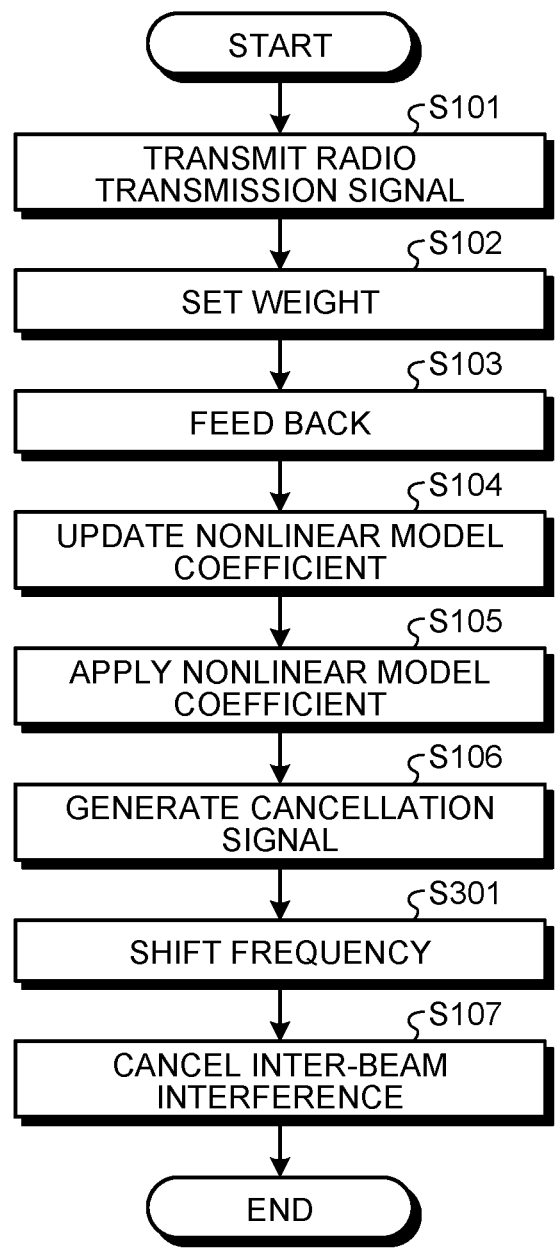
FIG. 10 is a flowchart illustrating an inter-beam interference suppression method according to the third embodiment.

In the following, the inter-beam interference suppression method performed in the RU 100 having the configuration described above will be described with reference to the flowchart illustrated in FIG. 10. In FIG. 10, components that are the same as those illustrated in FIG. 5 are assigned the same reference numerals and descriptions thereof in detail will be omitted. In a description below, the inter-beam interference suppression method of suppressing interference applied from the first beam to the second beam by generating a cancellation signal from the transmission signal of the first subarray will be described, and also, the same applies to inter-beam interference suppression method of suppressing the interference applied from the second beam to the first beam; therefore, both of the states of inter-beam interference are simultaneously suppressed.

The transmission signal of the first subarray is transmitted from each of the antenna elements of the first subarray by using the first beam (Step S101). The radio transmission signal that is output from the power amplifier 180 is transmitted from the antenna element and is also simultaneously output to the feedback unit 190. In the feedback unit 190, the weight of the phase shifter 191 is set to the weight that is the inverse of the weight that is set to the phase shifter 175 of the second subarray (Step S102). A phase shift is performed by the phase shifter 191 on the radio transmission signal transmitted from each of the antenna elements, so that a signal component in the direction of the second beam is extracted. The extracted signal component is fed back to the cancellation signal generating unit 127 as the FB signal (Step S103).

In the cancellation signal generating unit 127, the coefficient of the nonlinear model stored in the LUT in association with the address that is generated from the transmission signal of the first subarray is updated by the nonlinear model calculating unit 203 (Step S104). The LUT in which the coefficient is updated is periodically duplicated to the nonlinear model applying unit 204.

Then, the nonlinear model is applied to the canceled signal of the first subarray by the nonlinear model applying unit 204 (Step S105), the canceled signal is subtracted from the replica by the subtraction unit 205, so that the cancellation signal that cancels out the interference applied from the first beam to the second beam is generated (Step S106). The cancellation signal is added to the transmission signal of the second subarray and is then transmitted; therefore, the cancellation signal is transmitted as the signal at the carrier frequency $f_2$. In contrast, the signal of the first beam corresponding to the interference with respect to the second beam is the signal at the carrier frequency $f_1$; therefore, the frequency of the cancellation signal is different from the frequency of the interference component.

Thus, the frequency of the cancellation signal is shifted to the frequency of $f_{21}=f_1-f_2$ by the frequency converting unit 302 (Step S301), and the cancellation signal having a center frequency $f_{21}=f_1-f_2$ is generated. Then, the obtained cancellation signal is output to the cancellation signal adding unit 125 associated with the second subarray and is then subtracted from the transmission signal of the second subarray, so that interference applied from the first beam to the second beam is canceled out (Step S107). Namely, the cancellation signal to be added to the transmission signal in the cancellation signal adding unit 125 has the central frequency $f_{21}=f_1-f_2$ and this cancellation signal is converted to a signal at the carrier frequency $f_1$ by being subjected to up-conversion by the up-converter 155 that performs a process of up-conversion to the carrier frequency $f_2$. Then, this cancellation signal is emitted from the antenna element of the second subarray, so that the interference caused by the signal of the first beam transmitted from the first subarray at the carrier frequency $f_1$ is suppressed.

As described above, according to the embodiment, when the frequency of the transmission signal of the own subarray is different from the frequency of the transmission signal of the other subarray, by allowing the frequency of the cancellation signal to meet the frequency of the transmission signal of each of the subarrays by shifting the frequency of the cancellation signal. Consequently, even when the frequency of the transmission signal of the own subarray is different from that of the other subarray, it is possible to allow the frequency of the cancellation signal transmitted from the own subarray to match the frequency of the beam of the other subarray that corresponds to the interference and it is thus possible to enhance throughput by suppressing the inter-beam interference.

Furthermore, in the third embodiment described above, by shifting the frequency of the cancellation signal to allow the frequency of the cancellation signal to meet the frequency of the transmission signal of each of the subarrays; however, it may also be possible to convert the frequency of the FB signal in the down-converter 192 included in the feedback units 190 and 195 to the frequency of the other subarray. Namely, it may also be possible to use a configuration in which the FB signal at the frequency $f_2$ is fed back from the feedback unit 190 and the FB signal at the frequency $f_1$ is fed back from the feedback unit 195. In this case, the frequencies of the transmission signal and the canceled signal that are input to the cancellation signal generating units 123 and 127 are also converted to in accordance with the FB signal and are then input to the cancellation signal generating units 123 and 127, respectively.

[d] Fourth Embodiment

In the first to the third embodiments described above, feedback circuits that are used to update of the distortion compensation coefficients in the DPD processing units 122 and 126 are not illustrated; however, it is possible to integrate a feedback circuit with the feedback units 190 and 195. Accordingly, in a fourth embodiment, a description will be given of a case in which each of the feedback units 190 and 195 performs a feedback process for updating the distortion compensation coefficient and also reduces the size of the circuit.

The configuration of a radio communication system and the RU 100 according to the fourth embodiment is the same as that described in the first embodiment (FIGS. 1 and 2); therefore, descriptions thereof will be omitted. In the fourth embodiment, configurations of the feedback units 190 and 195 are different from those described in the first embodiment.

Figure 11:
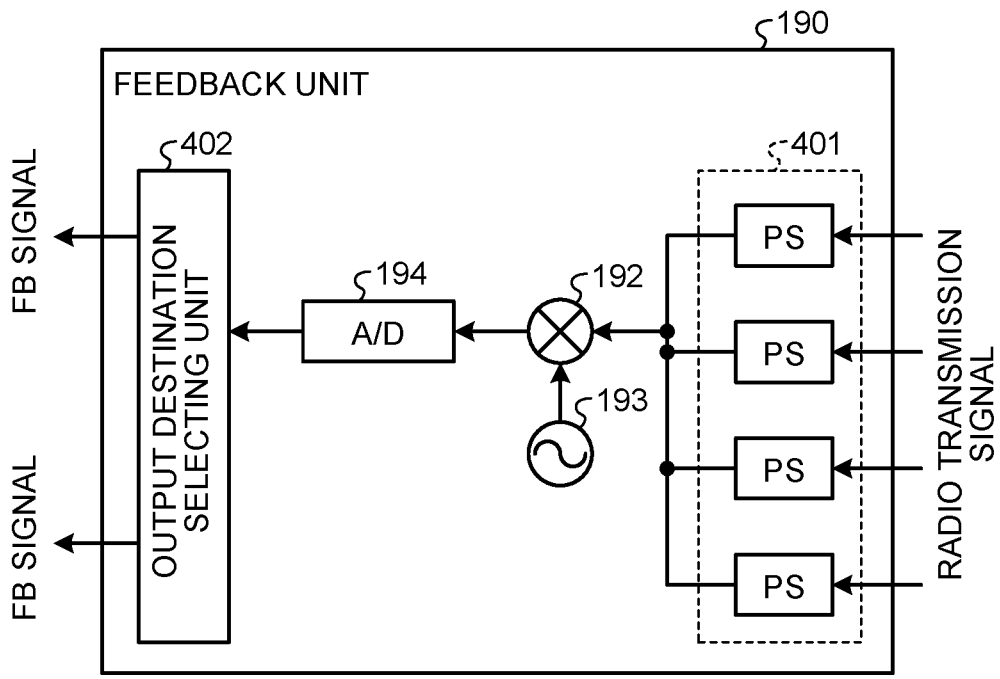
FIG. 11 is a block diagram illustrating a configuration of a feedback unit according to a fourth embodiment.

FIG. 11 is a block diagram illustrating a configuration of the feedback unit 190 according to the fourth embodiment. In FIG. 11, components that are the same as those illustrated in FIG. 3 are assigned the same reference numerals and descriptions thereof will be omitted. Furthermore, the feedback unit 195 has the same configuration as that of the feedback unit 190 illustrated in FIG. 11.

As illustrated in FIG. 11, the feedback unit 190 includes a phase shifter (PS) 401, the down-converter 192, the local oscillator 193, the A/D 194, and an output destination selecting unit 402.

The phase shifter 401 extracts a signal component of the main lobe of the first beam or a signal component that corresponds to the interference applied from the first beam to the second beam by shifting the phase by setting a weight to the radio transmission signal that is output from the power amplifier 180 of the first subarray. Namely, the phase shifter 401 changes, at a predetermined period, the weight to be set to the radio transmission signal and extracts, from the radio transmission signal that is transmitted from the first subarray, a signal component in a direction of the first beam or a signal component in a direction of the second beam.

Specifically, when the phase shifter 401 extracts a signal component in the direction of the first beam, the phase shifter 401 sets a weight that is the inverse of the weight that is set in the phase shifter 170 of the first subarray. Furthermore, when the phase shifter 401 extracts a signal component in the direction of the second beam, the phase shifter 401 sets a weight that is the inverse of the weight that is set in the phase shifter 175 of the second subarray.

The output destination selecting unit 402 selects an output destination of the feedback signal that is a signal component extracted by the phase shifter 401. Namely, the output destination selecting unit 402 selects an output destination of the FB signal from the DPD processing unit 122 and the cancellation signal generating unit 127. Specifically, when the signal component in the direction of the first beam is extracted by the phase shifter 401, the output destination selecting unit 402 outputs this signal component to the DPD processing unit 122 as the FB signal. Furthermore, when the signal component in the direction of the second beam is extracted by the phase shifter 401, the output destination selecting unit 402 outputs this signal component to the cancellation signal generating unit 127 as the FB signal.

Figure 12:
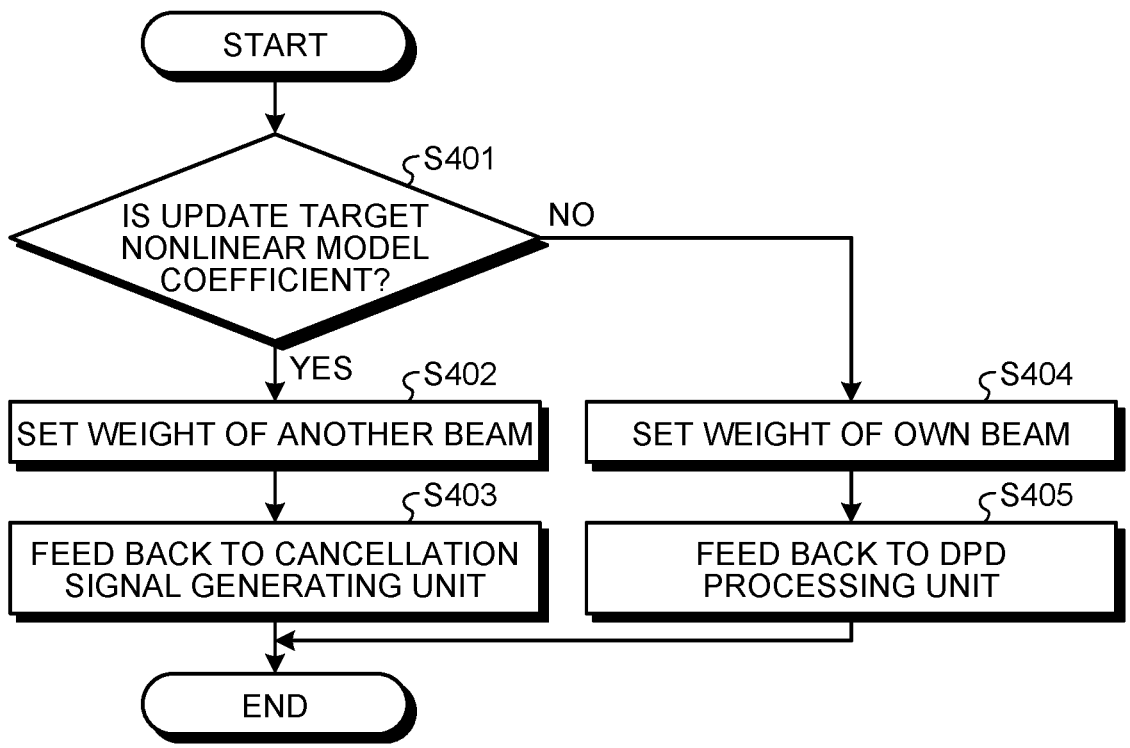
FIG. 12 is a flowchart illustrating a feedback method according to the fourth embodiment.

In the following, a feedback method performed in the feedback unit 190 having the configuration described above will be described with reference to the flowchart illustrated in FIG. 12.

In the feedback unit 190 according to the embodiment, the feedback destination is switched in a time-division manner depending on whether a coefficient to be updated is a distortion compensation coefficient or a coefficient of a nonlinear model. Namely, the update target is switched at a predetermined period (Step S401), and, when the update target is a coefficient of the nonlinear model (Yes at Step S401), the weight that is the inverse of the weight that is set to the phase shifter 175 of the second subarray is set to the phase shifter 401 (Step S402). Namely, the weight that is the inverse of the weight that is used to form the second beam is set to the phase shifter 401.

Then, the phase of the radio transmission signal that is output from the power amplifier 180 is shifted by the phase shifter 401 and the signal component in the direction of the second beam is extracted. This signal component is subjected to down-conversion by the down-converter 192, is subjected to A/D conversion by the A/D 194, and is output to the output destination that is selected by the output destination selecting unit 402. Here, because the update target is the coefficient of the nonlinear model, the cancellation signal generating unit 127 is selected as the output destination by the output destination selecting unit 402, and the FB signal is output to the cancellation signal generating unit 127 (Step S403).

In contrast, when the update target is the distortion compensation coefficient (No at Step S401), the weight that is the inverse of the weight that is set to the phase shifter 170 of the first subarray is set to the phase shifter 401 (Step S404). Namely, the weight that is the inverse of the weight that is used to form the first beam is set to the phase shifter 401.

Then, the phase of the radio transmission signal that is output from the power amplifier 180 is shifted by the phase shifter 401 and the signal component in the direction of the first beam is extracted. This signal component is subjected to down-conversion by the down-converter 192, is subjected to A/D conversion by the A/D 194, and is output to the output destination selected by the output destination selecting unit 402. Here, because the update target is the distortion compensation coefficient, the DPD processing unit 122 is selected as the output destination by the output destination selecting unit 402, and the FB signal is output to the DPD processing unit 122 (Step S405).

The DPD processing units 122 and 126 according to the embodiment update the distortion compensation coefficients in a period of time for which the signal component in the direction of the beam that is formed by the own subarray is fed back from the associated feedback units 190 and 195. Furthermore, the cancellation signal generating units 123 and 127 update the coefficients of the nonlinear model in a period of time for which the signal component in the direction of the beam that is formed by the other subarray is fed back from the associated feedback units 190 and 195. Consequently, it is possible to commonly use the feedback circuit for updating the distortion compensation coefficient and the coefficient of the nonlinear model and it is thus possible to reduce the size of the circuit.

As described above, according to the embodiment, because the weight that is set to the phase shifter provided in the feedback unit and the output destination of the FB signal is switched at a predetermined period, it is possible to perform an update of the distortion compensation coefficient and an update of the coefficient of the nonlinear model on the basis of the FB signal received from the common feedback unit. As a result, it is possible to reduce the size of the feedback circuit.

[e] Fifth Embodiment

The characteristic of the fifth embodiment is to limit the frequency band of the cancellation signal to the frequency band of the transmission signal.

Configurations of a radio communication system and the RU 100 according to the fifth embodiment are the same as those described in the first embodiment (FIGS. 1 and 2); therefore, descriptions thereof will be omitted. In the fifth embodiment, a configuration of the processor 120 is different from that described in the first embodiment.

Figure 13:
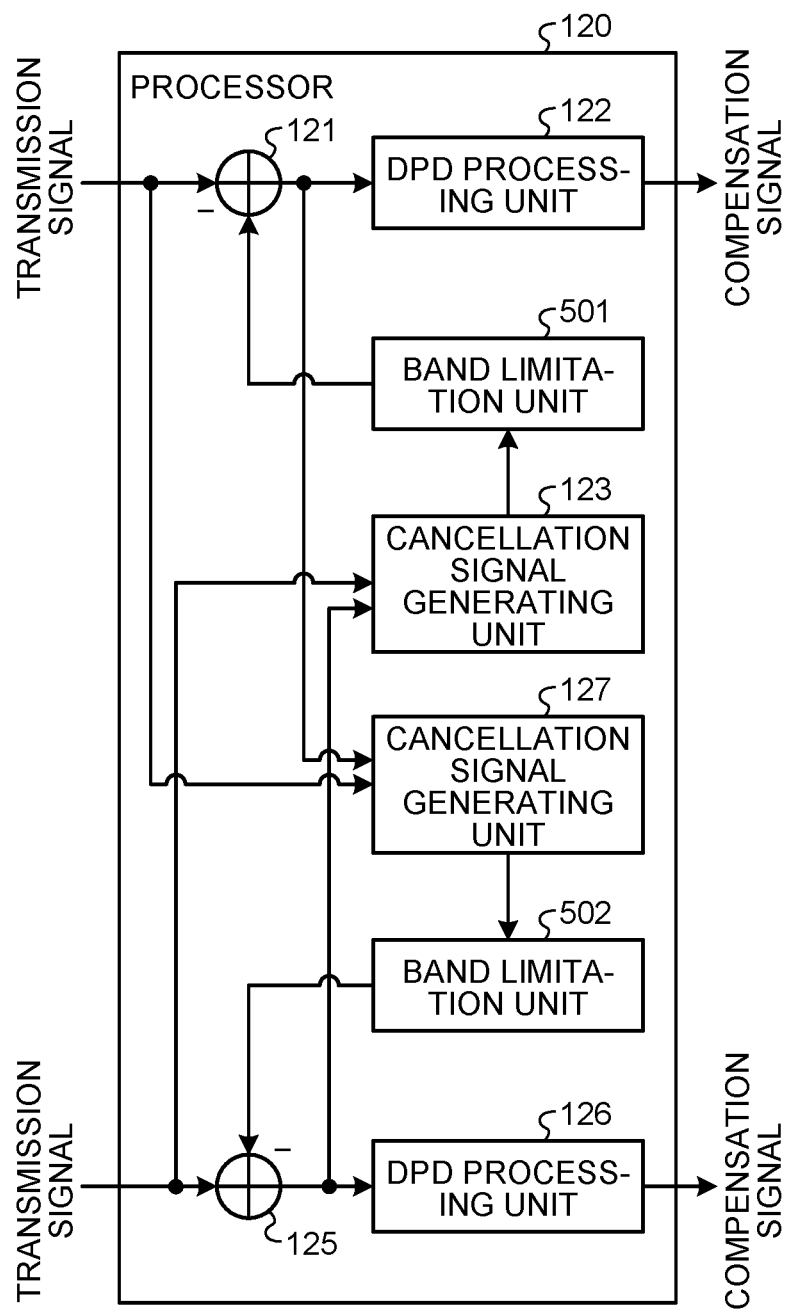
FIG. 13 is a block diagram illustrating a configuration of a processor according to a fifth embodiment.

FIG. 13 is a block diagram illustrating a configuration of the processor 120 according to the fifth embodiment. In FIG. 13, components that are the same as those illustrated in FIG. 2 are assigned the same reference numerals and descriptions thereof will be omitted. As illustrated in FIG. 13, the processor 120 has a configuration in which band limitation units 501 and 502 are added to the processor 120 that is illustrated in FIG. 2.

The band limitation unit 501 limits the frequency band of the cancellation signal that is generated by the cancellation signal generating unit 123. Specifically, the band limitation unit 501 includes a digital filter, such as a finite impulse response (FIR) filter, and limits the frequency band of the cancellation signal to the same frequency band of the transmission signal of the first subarray.

The band limitation unit 502 limits the frequency band of the cancellation signal that is generated by the cancellation signal generating unit 127. Specifically, the band limitation unit 502 includes a digital filter, such as a FIR filter, and limits the frequency band of the cancellation signal to the same frequency band of the transmission signal of the second subarray.

The cancellation signal that is generated by each of the cancellation signal generating units 123 and 127 has a frequency band that is three or five times the frequency band of the transmission signal. However, in order to improve the SIR in the UE 20 that receives a signal, the inter-beam interference may only be suppressed in the frequency band of the transmission signal. Thus, in the embodiment, the frequency band of the cancellation signal is limited by the band limitation units 501 and 502 and is allowed to meet the frequency band of the transmission signal. Consequently, the cancellation signal having the same frequency band as that of the transmission signal is added to the transmission signal, and thus, the inter-beam interference is suppressed in the frequency band of the transmission signal.

As described above, according to the embodiment, by limiting the frequency band of the cancellation signal to meet the frequency band of the transmission signal, the cancellation signal at a frequency band that is different from that of transmission signal is not emitted from the antenna element. As a result, it is possible to suppress degradation of ACLR in an area outside the frequency band of the transmission signal.

The first to the fifth embodiments described above may also be appropriately used in combination. For example, by using the first and the second embodiments in combination, it is also possible to suppress both of the inter-beam interference due to variations in the nonlinear characteristics of the power amplifiers 180 and 185 and the inter-beam interference due to the side lobes of the beam. Furthermore, for example, by using the third and the fifth embodiments in combination, it is also possible to limit, after performing frequency conversion on the cancellation signal, the frequency band of the cancellation signal in which the frequency has been converted.

Furthermore, in the first to the fifth embodiments described above, it is assumed that the weight that is the inverse of the weight that is set in the phase shifter 175 of the second subarray is set to the phase shifter 191 and the signal component in the direction of the second beam is extracted. However, for example, when control of a beam direction is discretely performed by the second subarray, the direction of the second beam does not always match the location of the UE 20. Accordingly, it may also be possible to optimize suppression of the inter-beam interference in the direction in which the UE 20 is located by performing fine adjustments on the weight of the phase shifter 191 on the basis of information on the direction of the second beam and the direction in which the UE 20 is located.

Furthermore, in the first to the fifth embodiments described above, it is assumed that indirect learning is performed such that the nonlinear model or the linear model that is calculated by the nonlinear model calculating unit 203 or the linear model calculating unit 211 is duplicated to the nonlinear model applying unit 204 or the linear model applying unit 212. However, it may also be possible to perform direct learning for generating a cancellation signal while updating the coefficient of the nonlinear model or the linear model using the FB signal by applying the updated coefficient without processing anything.

Furthermore, in the first to the fifth embodiments described above, a case in which the inter-beam interference is suppressed between the two subarrays of the first subarray and the second subarray has been described; however, it is also, of course, possible to suppress the inter-beam interference among three or more subarrays. When the inter-beam interference is suppressed among three or more subarrays, a cancellation signal is generated on the basis of the transmission signals, the canceled signals, and the FB signals from all of the other subarrays other than the own subarray and is added to the transmission signal of the own subarray. In this case, in each of the subarrays, a single feedback unit may be provided for each of the other subarrays and FB signals may be always output to all of the other subarrays, or only a single feedback unit may be provided and a FB signal may be output to each of the other subarrays in a time-division manner.

According to an aspect of the signal processing device and the inter-beam interference suppression method disclosed in the present invention, an advantage is provided in that it is possible to enhance throughput.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A signal processing device comprising:
   a first subarray that includes a plurality of power amplifiers and a plurality of phase shifters that are associated with a plurality of antenna elements, respectively, and that forms a first beam facing in a first direction;
   a second subarray that includes a plurality of power amplifiers and a plurality of phase shifters that are associated with a plurality of antenna elements, respectively, and that forms a second beam facing in a second direction that is different from the first direction;
   a feedback unit that feeds back at least signals that are output from the plurality of power amplifiers included in the first subarray; and
   a processor that is connected to the first subarray and the second subarray and that outputs a transmission signal to the first subarray and the second subarray, wherein the processor executes a process comprising:
   generating, based on a first feedback signal that is fed back by the feedback unit and the transmission signal that is output to the first subarray, a cancellation signal corresponding to an interference component that is applied to the second beam by the first beam; and
   adding the generated cancellation signal to the transmission signal that is output to the second subarray.

2. The signal processing device according to claim 1, wherein the feedback unit acquires the first feedback signal by extracting a signal component facing in the second direction from the signals that are output from the plurality of power amplifiers included in the first subarray and feeds back the first feedback signal to the processor.

3. The signal processing device according to claim 1, wherein the feedback unit includes a plurality of phase shifters to each of which a weight that is inverse of a weight set to each of the plurality of phase shifters included in the second subarray is set and each of which shifts a phase of each of the signals that are output from the plurality of power amplifiers included in the first subarray.

4. The signal processing device according to claim 1, wherein
   the feedback unit acquires a second feedback signal by extracting a signal component facing in the first direction from the signals that are output from the plurality of power amplifiers included in the second subarray and feeds back the second feedback signal to the processor, and wherein the processor further executes a process comprising:
   generating, based on the second feedback signal that is fed back by the feedback unit and the transmission signal that is output to the second subarray, a cancellation signal corresponding to an interference component that is applied to the first beam by the second beam; and
   adding the generated cancellation signal corresponding to the interference component that is applied to the first beam by the second beam to the transmission signal that is output to the first subarray.

5. The signal processing device according to claim 1, wherein the generating includes
   calculating, based on the first feedback signal that is fed back by the feedback unit and the transmission signal that is output to the first subarray, a nonlinear model that indicates a relationship between the transmission signal and the first feedback signal, and
   generating the cancellation signal by applying the calculated nonlinear model to the transmission signal that is output to the first subarray.

6. The signal processing device according to claim 1, wherein the generating includes
   calculating, based on the first feedback signal that is fed back by the feedback unit and the transmission signal that is output to the first subarray, a linear model that indicates a relationship between the transmission signal and the first feedback signal, and
   generating the cancellation signal by applying the calculated linear model to the transmission signal that is output to the first subarray.

7. The signal processing device according to claim 1, wherein the adding includes
   converting a frequency of the generated cancellation signal to a same frequency as a frequency of the transmission signal that is output to the second subarray, and
   adding the cancellation signal after frequency conversion to the transmission signal that is output to the second subarray.

8. The signal processing device according to claim 1, wherein the adding includes
   limiting a frequency band of the generated cancellation signal to a same frequency band as a frequency band of the transmission signal that is output to the second subarray, and
   adding the cancellation signal after band limitation to the transmission signal that is output to the second subarray.

9. The signal processing device according to claim 1, wherein the processor further executes a process comprising compensating, by using a distortion compensation coefficient, nonlinear distortion that occurs in the plurality of power amplifiers included in the first subarray, and wherein
the feedback unit feeds back, in a time-division manner, the first feedback signal that is used to generate the cancellation signal and another feedback signal that is used to update the distortion compensation coefficient.

10. An inter-beam interference suppression method for performing a process in a signal processing device that includes
a first subarray that includes a plurality of power amplifiers and a plurality of phase shifters that are associated with a plurality of antenna elements, respectively, and that forms a first beam facing in a first direction, and
a second subarray that includes a plurality of power amplifiers and a plurality of phase shifters that are associated with a plurality of antenna elements, respectively, and that forms a second beam facing in a second direction that is different from the first direction, the inter-beam interference suppression method comprising:
feeding back at least signals that are output from the plurality of power amplifiers included in the first subarray;
generating, based on a first feedback signal that is fed back and a transmission signal that is transmitted from the first subarray, a cancellation signal corresponding to an interference component that is applied to the second beam by the first beam; and
adding the generated cancellation signal to a transmission signal that is transmitted from the second subarray.

11. The inter-beam interference suppression method according to claim 10, wherein the feeding back includes acquiring the first feedback signal by extracting a signal component facing in the second direction from the signals that are output from the plurality of power amplifiers included in the first subarray and feeding back the first feedback signal.

12. The inter-beam interference suppression method according to claim 10, further comprising:
acquiring a second feedback signal by extracting a signal component facing in the first direction from the signals that are output from the plurality of power amplifiers included in the second subarray and feeding back the second feedback signal;
generating, based on the second feedback signal that is fed back and the transmission signal that is transmitted from the second subarray, a cancellation signal corresponding to an interference component that is applied to the first beam by the second beam; and
adding the generated cancellation signal corresponding to the interference component that is applied to the first beam by the second beam to the transmission signal that is transmitted from the first subarray.

13. The inter-beam interference suppression method according to claim 10, wherein the generating includes
calculating, based on the first feedback signal that is fed back and the transmission signal that is transmitted from the first subarray, a nonlinear model that indicates a relationship between the transmission signal and the first feedback signal, and
generating the cancellation signal by applying the calculated nonlinear model to the transmission signal that is transmitted from the first subarray.

14. The inter-beam interference suppression method according to claim 10, wherein the generating includes
calculating, based on the first feedback signal that is fed back and the transmission signal that is transmitted from the first subarray, a linear model that indicates a relationship between the transmission signal and the first feedback signal, and
generating the cancellation signal by applying the calculated linear model to the transmission signal that is transmitted from the first subarray.

* * * * *